United States Patent
Sgourakes et al.

[11] 3,875,969
[45] Apr. 8, 1975

[54] ALIGNMENT SLEEVES FOR FLANGELESS FLOWMETERS AND THE LIKE

[75] Inventors: George E. Sgourakes, Millis; Roy K. Selander, Walpole; Howard W. Holway, Sharon, all of Mass.

[73] Assignee: The Foxboro Company, Foxboro, Mass.

[22] Filed: Jan. 31, 1973

[21] Appl. No.: 328,191

[52] U.S. Cl. .................. 138/103; 138/178; 285/31
[51] Int. Cl. ........................................ G01f 55/00
[58] Field of Search ...... 29/271, 272; 33/84, 180 R, 33/181 R; 85/1 R; 138/103, 178, DIG. 11; 285/31, 177

[56] References Cited
UNITED STATES PATENTS

| 3,122,048 | 2/1964 | Warner | 85/1 |
| 3,310,623 | 3/1967 | Vaughan | 138/108 X |
| 3,603,905 | 9/1971 | Schuttoffel | 138/DIG. 11 X |
| 3,643,983 | 2/1972 | Ludeman | 285/31 |

Primary Examiner—Herbert Goldstein
Attorney, Agent, or Firm—Robert A. Seldon

[57] ABSTRACT

A sleeve whose wall thickness varies in a stepped manner which may be placed on flange bolts used in a mounting assembly for flangeless flowmeters and the like. A pair of these sleeves arranged on flange bolts so that the same wall thickness is presented towards the center of the bolt circle may be used for aligning the flowmeter with the center of the bolt circle.

6 Claims, 3 Drawing Figures

ALIGNMENT SLEEVES FOR FLANGELESS FLOWMETERS AND THE LIKE

BACKGROUND OF THE INVENTION

1. Field of the Invention

This invention is related to alignment techniques used for mounting flangeless flowmeters and similar flow related devices between pipe flanges in a fluid flow pipeline. Certain of these flow related devices, such as target meters and orifice plates, require critical alignment with the pipleline in order to function properly. These devices are mounted between flanges, formed into or affixed to the pipline ends, by means of flange bolts inserted through a pattern of holes in the flanges which describes a bolt circle. The bolt circle center is aligned with the center of pipeline. The instant invention relates to a device operable to align the flow device with the bolt circle center during mounting.

2. Description of the Prior Art

One conventional method for aligning flow devices between flanges requires that the device be mounted in a housing having flanges. The device may be aligned within the housing by using test equipment or matching specially machined surfaces. The housing may then be installed in the line by bolting the flanges together. An example of this general approach is shown in U.S. Pat. No. 2,585,290. One obvious disadvantage of this general approach is the expense of the housing.

Another known method of aligning such devices is by means of alignment pins as shown in U.S. Pat. No. 1,206,185. This approach is relatively time consuming and requires a complicated procedure.

A third method, closely related to the instant invention, uses rings which are cut so that the outside diameter of the ring fits closely within the bolt circle of the flanges while the inner diameter of the rings serves as a guide for the outside diameter of the device. The device may then be aligned within the inner diamter of the rings which is concentric with the outer diameter and thereby is aligned with the bolt circle and the flowline. This method requires a special size of ring for each combination of flowline diameter and pressure. High inventory cost are thereby incurred.

SUMMARY OF THE INVENTION

It is an object of the instant invention to provide an alignment sleeve for use with flangeless flowmeters and the like to align said devices during mounting. It is another object of the instant invention to provide such a device that may conveniently be used in the field without additional equipment. It is a further object to provide such a device which may be used interchangeably with many different combinations of pipe size and line pressure ratings.

These and other objects are accomplished by the instant invention wherein a pair of alignment sleeves are provided for placement on two of the flange bolts or studs used to secure the flanges about the flow device. Each of these sleeves preferably comprises a pair of mutually aligned collars, each collar having a central hole and a plurality of faces spaced from the hole axis by distances which vary in a stepped manner so that the sleeve may be rotated to accommodate many combinations of pipe size and line pressure ratings. The collar pairs are separated by a distance which allows the cradling of the flow device at oposite ends thereof. The flow device is thereby positioned concentric to the bolt circle and pipeline so that the remainder of the flange bolts may be inserted and secured. The sleeves may be removed and reused, if desired, by temporarily removing the corresponding flange bolts.

Each alignment sleeve may be provided with, for example, four faces having different corresponding wall thicknesses so that one pair of identical sleeves may be employed to align many combinations of flow devices, pipe sizes, and line pressure ratings.

DETAILED DESCRIPTION OF THE DRAWINGS

DETAILED DESCRIPTION OF A PREFERRED EMBODIMENT

Figure 1:
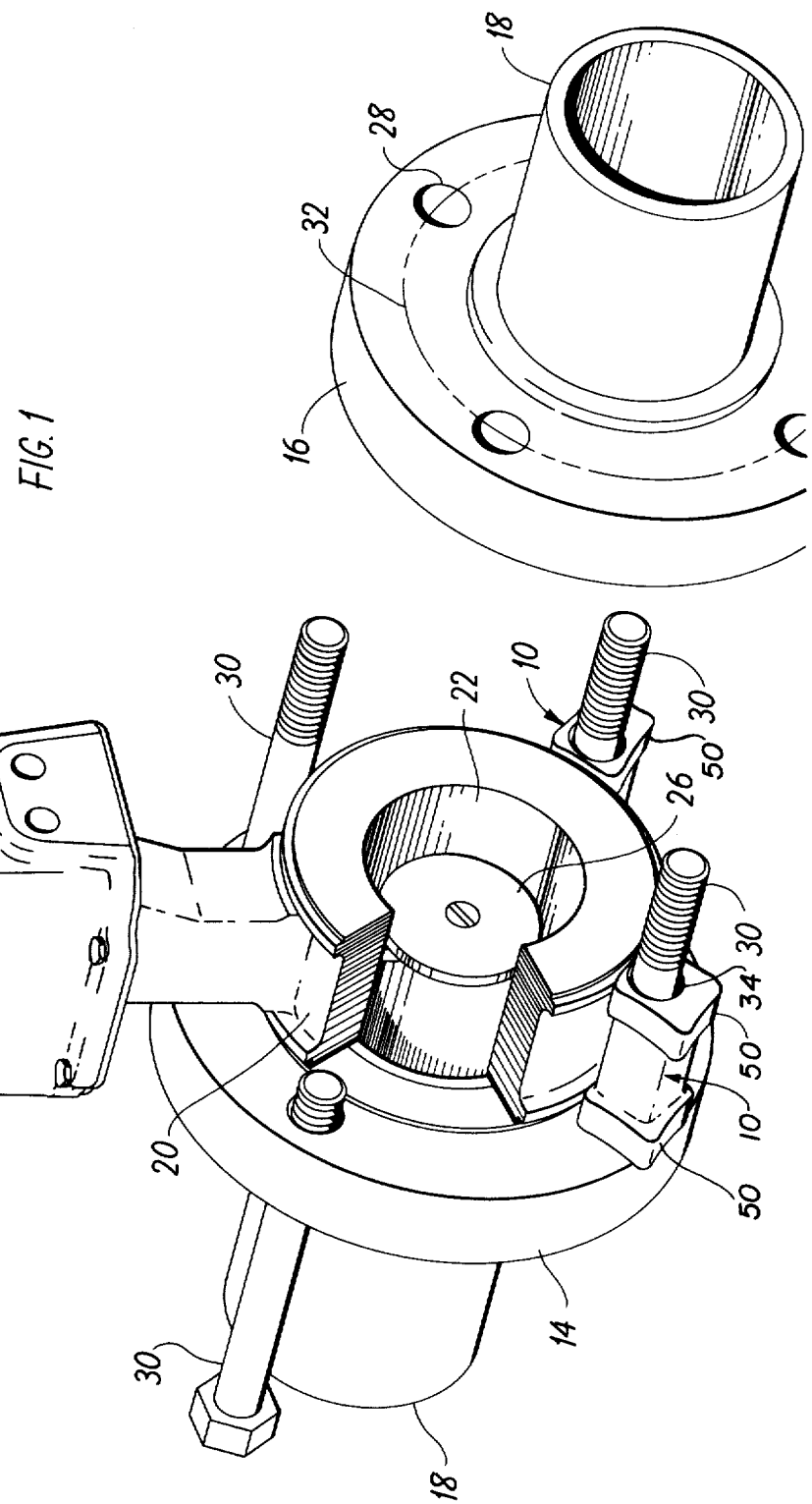
FIG. 1 shows a flangeless flowmeter of the target meter type installed between two flanges in a pipeline using alignment sleeves according to the instant invention. One flange has been moved away from the target meter in order to more clearly show the mounting arrangement.

In a preferred embodiment of the invention, as shown in FIG. 1, alignment sleeves 10 are used to align flow device 12 between flanges 14 and 16 in pipeline 18. Each of the alignment sleeves 10 comprise a pair of mutually aligned collars 50 spaced a predetermined distance apart to cradle the flow device 12 at opposite ends thereof. Each of the collars 50 has a central hole 52 and the plurality of faces spaced from the hole axis by a distance which varies in a stepped manner. For descriptive purposes, flange 16 has been moved away from flange 14. In an actual arrangement, the distance between the inner faces of the flanges would be approximately equal to the thickness of body 20 of flow device 12, plus any required gaskets. For illustrative purposes, a target flowmeter is shown. Flow device 12 therefore consists of body 20, having inner passage 22 which matches the inner passage of pipe 18, and transmitter 24. A section of body 20 has been removed to clearly show target 26 which is supported concentrically within passage 22 so that flow-through pipeline 18 applies a force to target 26.

This force is transmitted to transmitter 24 by a support mechanism not visible in FIG. 1. Indicating or recording mechanisms may then be connected to transmitter 24 to represent flow. The accuracy of this flow representation is in part dependent upon the alignment of target 26 within the flowline. The mounting and alignment techniques described herein are equally applicable to other flow devices intended to be mounted between flanges that require critical alignment with the flowline.

Flanges 14 and 16 are affixed to the open ends of pipe 18. Each flange has a pattern of holes 28 through which flange bolts 30 may be inserted and secured by nuts, not shown. This pattern of holes describes a bolt circle 32 which runs through the center of holes 28. The flanges are mounted on the pipe ends so that the bolt circle is concentric with the inner passage of pipe 18.

To mount the flowmeter, alignment sleeves 10 are positioned with respect to two of the holes, chosen so that they will support the weight of meter 12 equally, and flange bolts are inserted through one flange into the corresponding alignment sleeves and then through the opposite flange. Alignment sleeves 10 then may be rotated so that the appropriate collar face will contact the body 20 as described below. Flowmeter 12 may then be positioned upon sleeves 10 and be cradled thereby. Flange bolts 30 may then be secured. If desired, alignment sleeve 10 may be removed by temperarily removing the appropriate bolts.

Figure 2:
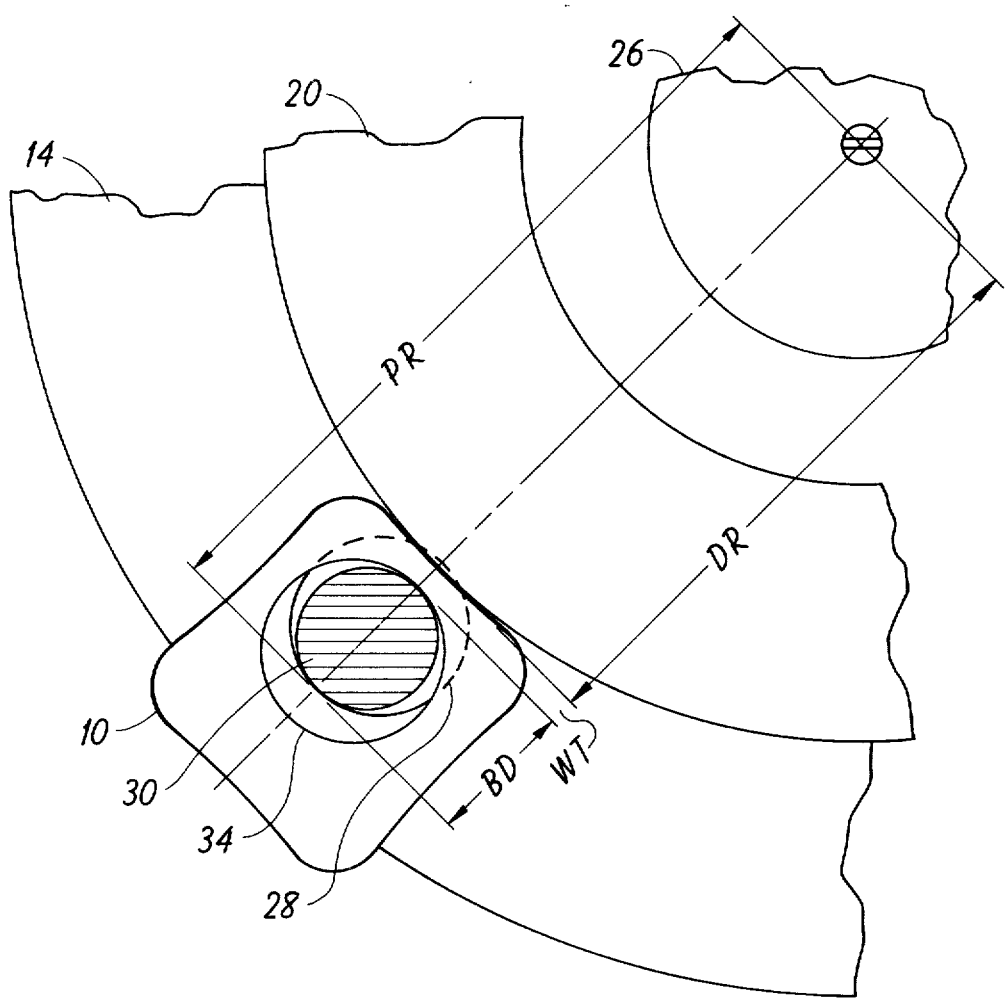
FIG. 2 is an enlarged detailed view of one of the flange bolt and alignment sleeve combinations of the installation depicted in FIG. 1. In this view, the parts are slightly exaggerated to better show the relationship between bolt hole, flange bolt, and alignment sleeve hole.

As shown in FIG. 2, the diameter of flange bolt 30 is significantly less than the diameter of hole 28. In addition, hole 34 in sleeve 10 is significantly larger than the diameter of bolt 30 so that sleeve 10 may be utilized with the range of bolt sizes that is employed with the range of flange sizes used.

When a flow device is cradled upon a pair of sleeves as shown in FIG. 1, the weight of body 20 forces sleeve 10 against bolt 30, and bolt 30 radially outward from the center of bolt circle 32 to the outer surface of hole 28 as shown in FIG. 2. It is therefore possible to design sleeve 10 so that the wall thickness of the collar between body 20 and bolt 30 is just sufficient to align the center of target 26 with the center of pipe 18 as required for proper operation of flow device 12.

Figure 3:
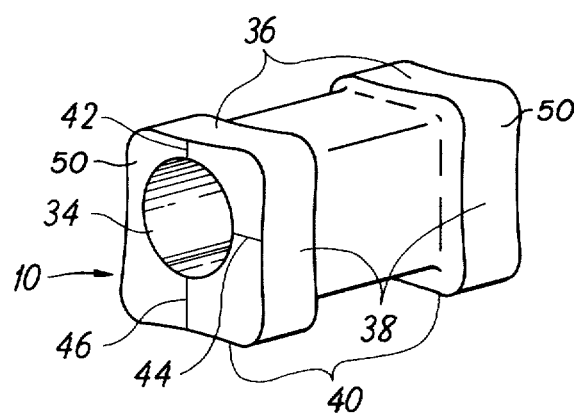
FIG. 3 is a view of a preferred embodiment of the alignment sleeve of the invention having three distinct wall thicknesses.

FIG. 3 is a detailed view of alignment sleeve 10 showing collar faces 36, 38 and 40 upon which body 20 may be rested. Each face is associated with a particular wall thickness which is defined as the distance between the corresponding point on the edge of hole 34 to the point of contact of body 20 on the face. The wall thicknesses for faces 36, 38 and 40 are identified as 42, 44 and 46, respectively. Sleeve 10 may be constructed from any suitable material, preferably metal for durability, and may be configured as required for each type of construction as long as hole 34 is accurately formed and the faces are smoothed and slightly concave so that body 20 is cradled but only contacted at one point. The preferred embodiment shown in FIG. 3 has been cast so that the sleeve, as depicted, has a central tubular section reduced in size that does not interfere with the operation of the device.

Alignment sleeve 10 has been designed to be usable with a wide range of pipe sizes and pressure ratings. The bolt circle configuration, flange hole size and flange bolt diameters vary widely, but predictably, within this range. Various standards are used in the industry with regard to these dimensions. One such standard is called the American National Standard. Tables of these dimensions are presented in publications such as "USA Standard for Steel Pipe Flanges and Flanged Fittings, USAS B16.5-1968."

Once these dimensions are known, the required wall thickness for a particular installation may be determined as follows.

As shown in FIG. 2, radius $PR$ from the center of pipe 18 to the outside surface of flange bolt hole 28 must equal the sum of the diameter $BD$ of bolt 30 plus wall thickness $WT$ of collar 50 plus radius $DR$ from the center of target 26 to the outer edge of body 20. Stated another way:

$$WT = PR - (BD + DR)$$

It is apparent, then, that sleeve 10, as shown, can be used for at least three particular combinations of pipe size and pressure rating. However, the permutations resulting from the variations in dimensions within the ranges in question usually result in a particular wall thickness being suitable for a plurality of combinations.

It must be noted that although the invention has been described with reference to a preferred embodiment, it is well within the ordinary skill of the art to make minor variations in form without departing from the spirit or scope of the invention as defined in the claims.

We claim:

1. A mounting assembly for use in aligning the fluid conducting passage formed within the body of a flangeless flow conducting device mounted in a pipeline between longitudinally aligned pipe flanges, said flanges being secured to each other by a plurality of flange bolts inserted through a pattern of flange holes forming a bolt circle centered about the longitudinal axis of the pipeline comprising:

a pair of collars, each having a bolt receiving hole formed therethrough and a plurality of device supporting faces parallel to the hole axis, each of said faces being spaced different alignment establishing distances from said axis by the particular wall thickness required to support said passage in alignment with said pipeline for a particular combination of pipe diameter and fluid pressure ratings, said pair of collars being positioned about a pair of flangebolts serving as a cradle for the flow device so that the flow device is aligned with the pipe flange during mounting.

2. The mounting assembly of claim 1 including in combination with each collar:

an additional collar, and means for spacing the collars apart while substantially aligning the holes thereof to form a bolt sleeve for cradeling opposite ends of the flow device.

3. The mounting assembly of claim 2 for use in aligning the passage with sealing gaskets wherein the length of the sleeve is greater than the length of the flow device.

4. An improved mounting assembly for use in aligning the fluid conducting passage of a flangeless flow-conducting device mounted in a pipeline between longitudinally aligned pipe flanges, said flanges being secured to each other by a plurality of flange bolts inserted through a pattern of flange holes forming a bolt circle centered about the longitudinal axis of the pipeline, wherein the improvement comprises:

a body for said device having an outer surface spaced a pre-determined distance from the longitudinal axis of said passage, and a pair of collars, each having a plurality of faces parallel to, and spaced different wall thickness distances from, the axis of a central opening formed therethrough, said collars being mounted on a pair of said flange bolts to cradle said body within said bolt circle on a pair of said faces selected to align the longitudinal axes of said passage with said pipeline, whereby said collars may be interchangeably used with a plurality of pipelines having different combinations of pipe diameters and fluid pressure ratings.

5. The mounting assembly of claim 4 wherein each face is a concave surface having a radius of curvature significantly greater than the outside radius of the flow device, whereby each face may be used to cradle the flow device while contacting the flow device only along a line of the face parallel to the hole axis.

6. The mounting assembly of claim 4 wherein the collar has a roughly rectangular cross-section, a central opening is formed therethrough, the sides of the rectangle form the faces, and the central opening is an off-center circular hole whose axis is parallel to each of the faces.

* * * * *